July 14, 1931.  G. HERZBERGER  1,814,803

REFUSE RECEPTACLE

Filed Sept. 14, 1929

INVENTOR
George Herzberger
BY
Percy Freeman
ATTORNEY

Patented July 14, 1931

1,814,803

UNITED STATES PATENT OFFICE

GEORGE HERZBERGER, OF STAMFORD, CONNECTICUT

REFUSE RECEPTACLE

Application filed September 14, 1929. Serial No. 392,505.

This invention relates to improvements in devices for facilitating the cutting of meats and more particularly to means for the disposal of débris incidental to such operations.

The usual procedure in cutting meats in butcher shops is to scrape the bones, unacceptable fats and like refuse off the surface of the block and convey it piecemeal to some place of disposal after each cutting, thereby consuming considerable time and incidentally littering the surroundings with offal unpleasant and offensive to the purchaser.

It is therefore an object of the present invention to provide a container to conveniently receive all such matter direct from the block and which can be emptied at will.

A further feature is to provide a can suited to enter between the block supports, closely against its inner surface, a limited distance only and having means to receive and guide the débris, as it is scraped off the block, directly therein.

These and other advantageous objects which will later appear, are accomplished by the novel and practical construction and arrangement of parts as hereinafter described and shown in the accompanying drawings, forming a material part of this disclosure, and in which.

Figure 1:
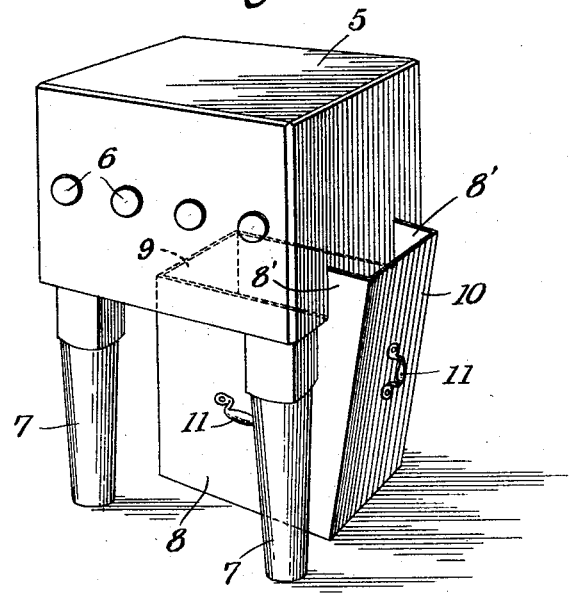
Fig. 1, is a perspective view of a conventional type of meat chopping block, illustrating the application of the invention.

The block as seen in Fig. 1, is in all respects of the usual type, consisting of a plurality of hard wood planks 5, rigidly clamped in intimate relation by bolts 6 and provided with substantial leg supports 7 at the corners which raise the block above the floor to a convenient height.

A container of rectangular cross section, composed of two straight sides 8 and end 9 disposed at right angles with the bottom; the fourth wall 10 is flared outwardly and extended upwardly above the normal level of the container, as are also portions 8' of the side walls 8 adjacent the outer wall.

Handles 11 may be provided on the side and outer wall members, facilitating moving the container.

Figure 2:
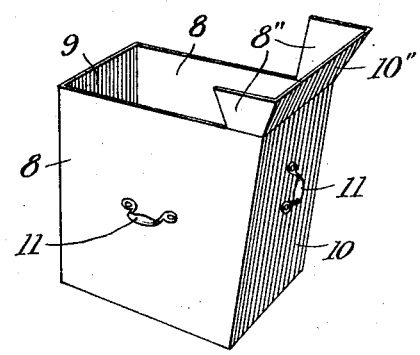
Fig. 2, is a perspective view in detail of a slightly modified form of the container.

In the modification shown in Fig. 2, the extensions 8'' and 10'' are bent angularly outward forming in effect funnel shaped elements serving to deflect any droppings into the container.

In operation the container is entered below the lower surface of the block, preferably filling the space betwen any of the pairs of supports by which it is retained in position and obviously any scrapings from the block are guided into the container there to be held until the accumulations can be disposed of.

Although the foregoing is descriptive of the preferred embodiment of the invention, it will be apparent that minor changes may be made in the construction, without the exercise of invention or conflicting with the scope of the claims hereto appended.

Having thus described my invention, what I claim as new and desire to secure by Letters Patent, is:—

A container for use in connection with a meat chopping block having supports at its corners, said container comprising a metal can of rectangular cross section adapted to enter between two of the block supports below the block, and raised, outwardly flaring extensions on opposed portions of the side walls and outer wall of said can limiting the entrance of the can below said block.

Signed at New York, in the county and State of New York, this 12th day of September, 1929.

GEORGE HERZBERGER.